United States Patent
Das

(10) Patent No.: US 8,656,055 B2
(45) Date of Patent: Feb. 18, 2014

(54) PROTOCOL WRAPPER AND SERIALIZER/DESERIALIZER FOR FACILITATING DATA EXCHANGES

(75) Inventor: Sanjoy Das, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 821 days.

(21) Appl. No.: 12/547,203

(22) Filed: Aug. 25, 2009

(65) Prior Publication Data

US 2011/0055427 A1 Mar. 3, 2011

(51) Int. Cl.
*G06F 15/16* (2006.01)
*H04L 29/08* (2006.01)
*H04L 29/06* (2006.01)

(52) U.S. Cl.
CPC ............. *H04L 67/06* (2013.01); *H04L 29/0651* (2013.01); *H04L 29/08783* (2013.01); *H04L 29/08792* (2013.01)
USPC .......................................... 709/246; 709/236

(58) Field of Classification Search
CPC ... H04L 67/06; H04L 69/04; H04L 29/08792; H04L 29/08783; H04L 29/0651
USPC .................... 709/203, 236, 246, 247
See application file for complete search history.

(56) References Cited

U.S. PATENT DOCUMENTS

| | | | |
|---|---|---|---|
| 6,438,559 B1* | 8/2002 | White et al. | 1/1 |
| 6,928,488 B1* | 8/2005 | de Jong et al. | 709/246 |
| 2003/0145315 A1* | 7/2003 | Aro et al. | 717/170 |
| 2006/0047780 A1* | 3/2006 | Patnude | 709/219 |
| 2006/0168513 A1* | 7/2006 | Coulson et al. | 715/513 |
| 2007/0208605 A1* | 9/2007 | Ambrose et al. | 705/9 |

OTHER PUBLICATIONS

Adobe Systems Inc. "AMF 3 Specification: Category: ActionScript Serialization", pp. 1-13, 2006.*
Adobe Systems Inc. SWF File Format Specification, Version 9, Published Jun. 2007, Apr. 2008.*
Todd Greanier, Discover the secrets of the Java Serialization API, Jul. 2000, http://java.sun.com/developer/technicalArticles/Programming/serialization/, pp. 1-7.
Adobe Systems Incorporated, SWF File Format Specification, Version 9, Published Jun. 2007, Apr. 2008.
Adobe® FLEX™ 2, Programming ActionScript 3.0, pp. 1-524.
Adobe Systems Incorporated, AMF 3 Specification; Category: ActionScript Serialization, pp. 1-13.

* cited by examiner

*Primary Examiner* — Brian J Gillis
(74) *Attorney, Agent, or Firm* — Miles & Stockbridge P.C.

(57) ABSTRACT

A computer-readable medium, computer-implemented method, apparatus, and system for converting and restoring an object are provided. In one embodiment, an object created by a server is serialized, at the server, into a compressed object format. The compressed object format is then inserted into a tag of a file. The file can then be sent from the server to the client at runtime. In another embodiment, a file is received, at a client. The client then automatically deserializes and loads the compressed data within the tag of the file into an object created by the client. The client then uses the object to load and invoke a view engine in order to render a view.

19 Claims, 8 Drawing Sheets

PROTOCOL WRAPPER AND SERIALIZER/DESERIALIZER FOR FACILITATING DATA EXCHANGES

FIELD

One embodiment is directed generally to a computer system, and in particular to a computer system that provides for visual analysis of data.

BACKGROUND

Computer systems can be utilized to display data in a visual format utilizing a server/client model where a server stores one or more data sets (such as data queried from a database to render different views, e.g., Chart, TreeMap, etc.), and transfers the data sets to a client via a file transfer mechanism. Once the client receives the file which includes the data sets, the client displays the data sets in order that a user may view the data sets. Certain computer systems facilitate the transfer of data from the server to the client via an Extensible Markup Language ("XML") format, where an XML file is used to contain the data that is transferred from the server to the client. However, one problem with the XML format is that, when huge data sets are being transferred (in the order of thousands or millions of data points), the size of the XML file can grow to be very large, causing delays in the display of the data by the client, and other network bandwidth issues. Another problem with the XML format is increased overhead, as the client must parse the XML data after the server has transferred the XML file to the client in order to correctly display the data to the user.

SUMMARY

One embodiment of the invention is directed to a computer-readable medium having instructions stored thereon, when executed by a processor, cause the processor to convert an object. The instructions can include associating an identity with a data value of a server object to create an identity-value pair, and serializing the server object into a data block of a format using the identity-value pair. The instructions can further include inserting the data block into a first tag of a file, inserting a name of a client object that corresponds to an identity of the identity-value pair into a second tag of the file, and transmitting the file to a client.

Another embodiment of the invention is directed to a computer-readable medium having instructions stored thereon, when executed by a processor, cause the processor to restore an object. The instructions can include receiving a first file from a server, where the first file includes a first tag and a second tag, where the first tag includes a data block of a format, where the second tag includes a name of a client object, and where the data block includes an identity-value pair where an identity is associated with a data value of a server object, and automatically deserializing and loading the data block into a client object based on the name of the client object within the second tag. The instructions can further include extracting an identity of identity-value pair, and extracting a value of the identity-value pair and populating the value into the client object based on the identity of the identity-value pair.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment of the invention is directed towards serializing an object created by a server, at the server, into a compressed object format. The compressed object format is then inserted into a tag of a file. The file can then be sent from the server to the client at runtime.

Another embodiment of the invention is directed towards receiving a file, at a client. The client then automatically deserializes and loads the compressed data within the tag of the file into an object created by the client. The client then uses the object to load and invoke a view engine in order to render a view.

Figure 1:
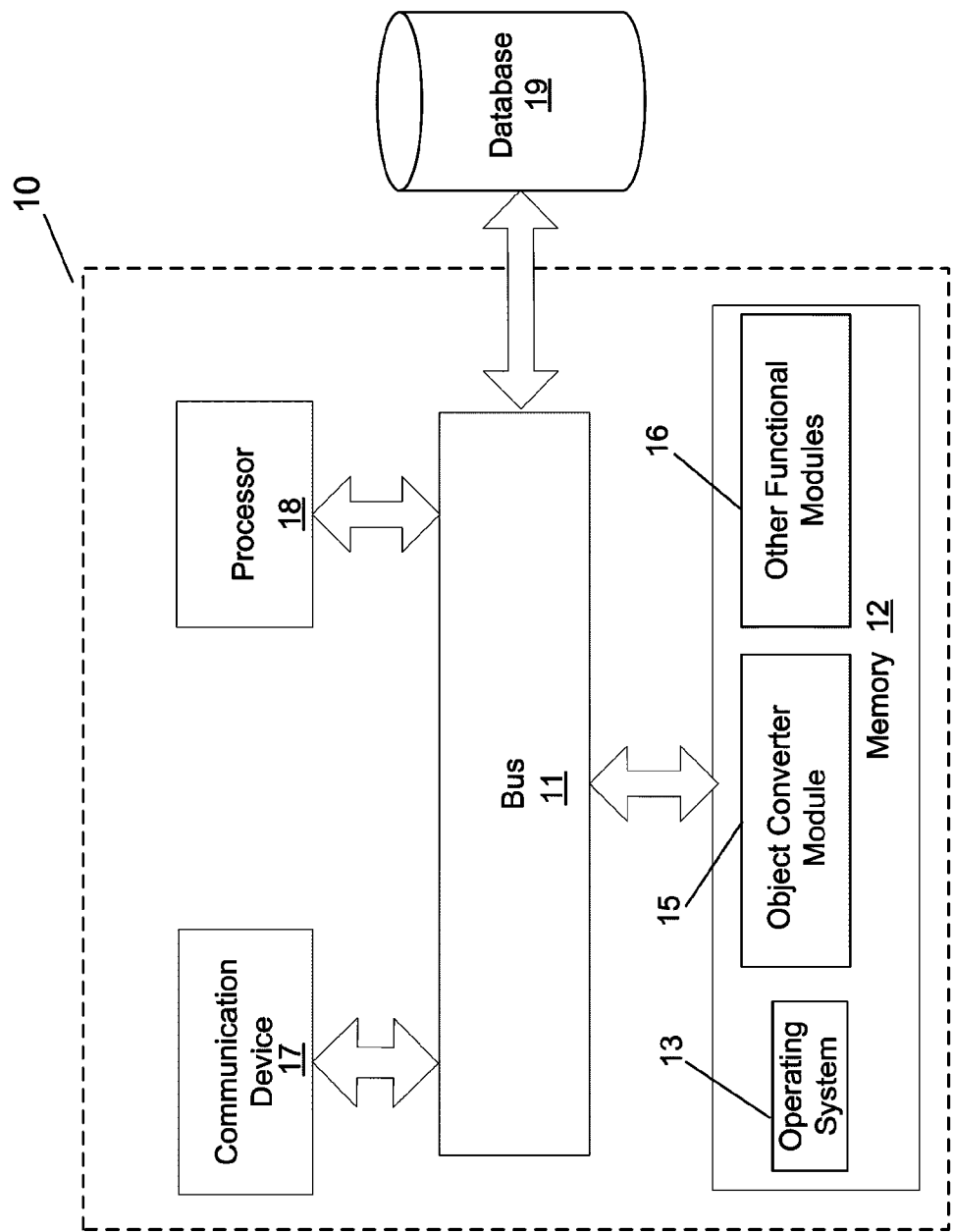
FIG. 1 illustrates a block diagram of a server of a computer system that may implement an embodiment of the present invention.

FIG. 1 illustrates a block diagram of a server 10 that may implement one embodiment of the invention. Server 10 includes a bus 11 or other communications mechanism for communicating information between components of server 10. Server 10 also includes a processor 18, operatively coupled to bus 11, for processing information and executing instructions or operations. Processor 18 may be any type of general or specific purpose processor. Server 10 further includes a memory 12 for storing information and instructions to be executed by processor 18. Memory 12 can be comprised of any combination of random access memory ("RAM"), read only memory ("ROM"), static storage such as a magnetic or optical disk, or any other type of machine or computer-readable medium. Server 10 further includes a communication device 17, such as a network interface card or other communications interface, to provide access to a network. As a result, a client may interface with server 10 directly, or remotely through a network or any other method.

In the embodiment, server 10 also includes a connection to a database 19 in order for server 10 to permanently store data. As a non-limiting example, database 19 may comprise a relational database. However, one of ordinary skill in the art would readily understand that in alternative embodiments, server 10 may include a local storage for storing data, such as a cache, as opposed to a connection to a database. Furthermore, in alternative embodiments, server 10 may not include any mechanism for permanently storing data, such as a connection to a database or a cache.

A computer-readable medium may be any available medium that can be accessed by processor 18. Computer-readable medium may include both volatile and nonvolatile media, removable and non-removable media, communication media, and storage media. Communication media may include computer readable instructions, data structures, program modules or other data in a modulated data signal such as a carrier wave or other transport mechanism, and may include any information delivery media. Storage media may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

According to one embodiment, memory 12 can store software modules that may provide functionality when executed by processor 18. The modules can include an operating system 13, an object converter module 15, as well as other functional modules 16. Operating system 13 can provide an operating system functionality for server 10. Object converter module 15 provides for the conversion of an object into a data block which will be described below in more detail. Server 10 can also be part of a larger system. Thus, server 10 can include one or more additional functional modules 16 to include the additional functionality. In an embodiment of the invention, functional modules 16 may include modules that are part of the "Business Intelligence Visualizations" product from Oracle Corporation.

For example, functional modules 16 may include modules which develop specialized Business Intelligence-specific visualizations such as a Business Intelligence Visualizations Chart, Treemap, Decomposition Tree, Balanced Score-Card view, a dimensional-aware visualization, such as Hyperion Visual Explorer, and any visualization that is not easily supported by a Data Visualization Tool ("DVT"). In an embodiment, functional modules 16 include a Business Intelligence Visualizations Java® API layer for running the Business Intelligence Visualizations application, a view data model for modeling data to be viewed by the client, a common rendering module for rendering the view, and an abstract geometry module. In the embodiment, the common rendering module includes a Java2D rendering engine for producing a Scalable Vector Graphics ("SVG") file or a Portable Network Graphics ("PNG") file for visually displaying the data, and a Flash® Small Web Format ("SWF") Generation Module for generating a SWF file for visually displaying the data. As one of ordinary skill in the art would understand, Java2D is a set of Java® classes for advanced 2D graphics and imaging, which provide support for image compositing, alpha channel images, accurate color space definition and conversion, and a rich set of display-oriented imaging operations. As one of ordinary skill in the art would also understand, Flash® is a multimedia platform which can manipulate vector and raster graphics, support bidirectional streaming of audio and video.

According to an embodiment of the invention, server 10 supports both an "online" mode and an "offline" mode. The main differences between "online" mode and "offline" mode are in the way a view is generated, and in the way the view is rendered. In terms of view generation, when server 10 is in "online" mode, a viewing engine library is first loaded in a client. In an embodiment, the client is an Internet browser. During run time, when the client requests server 10 for specific view data and properties, server 10 generates a file which includes the requested view data and properties, and sends the file to the client. In an embodiment of the invention, the file is a Flash ® SWF file. When server 10 is in "offline" mode, the server generates a single self-sufficient file that contains both the viewing engine library and the view data and properties required to render the view, and sends the self-sufficient file to the client. In an embodiment of the invention, the single self-sufficient file is a Flash® SWF file as well. In terms of rendering the view, when server 10 is in "online" mode, as described above, a viewing engine library is first loaded into the client in order to render the view with the file which includes view data and properties, generated by server 10. When server 10 is in "offline" mode, as also described above, a single self-sufficient file that contains both the viewing engine library and the view data and properties is generated at server 10 and sent to the client. This self-sufficient file is then rendered by the client.

Figure 2:
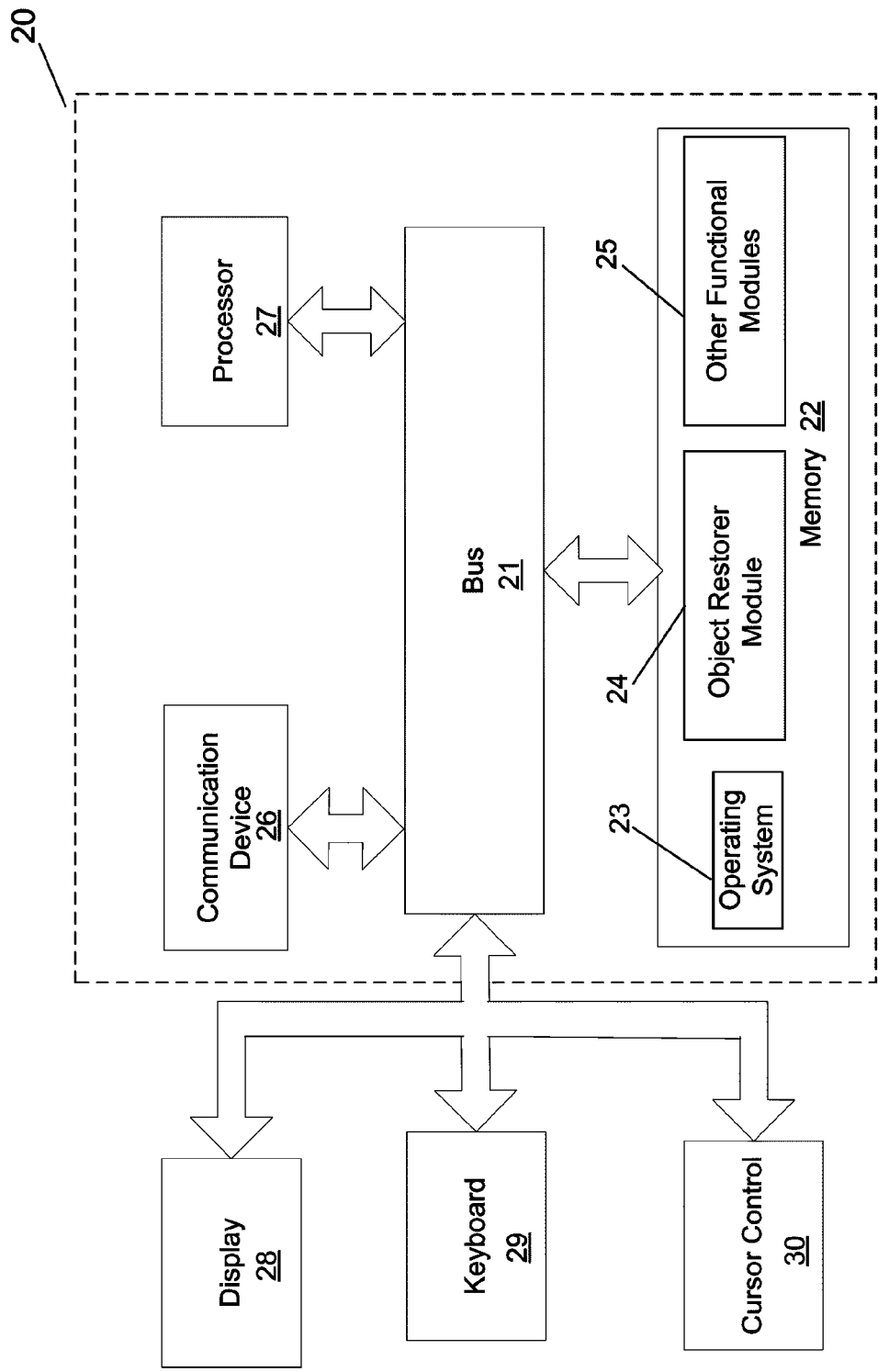
FIG. 2 illustrates a block diagram of a client of a computer system that may implement an embodiment of the present invention.

FIG. 2 illustrates a block diagram of a client 20 that may implement one embodiment of the invention. Client 20 includes a bus 21 or other communications mechanism for communicating information between components of client 20. Client 20 also includes a processor 27, operatively coupled to bus 21, for processing information and executing instructions or operations. Similar to processor 18 of FIG. 1, processor 27 may be any type of general or specific purpose processor. Client 20 further includes a memory 22 for storing information and instructions to be executed by processor 27. Similar to memory 12 of FIG. 1, memory 22 can be comprised of any combination of RAM, ROM, static storage such as a magnetic or optical disk, or any other type of machine or computer-readable medium. Client 20 further includes a communication device 26, such as a network interface card or other communications interface, to provide access to a network. As a result, client 20 may interface with a server directly, or remotely through a network or any other method. In an embodiment of the invention, client 20 functions as an Internet browser.

Processor 27 can also be operatively coupled via bus 21 to a display 28, such as a Liquid Crystal Display ("LCD"). Display 28 can display information to a user. A keyboard 29 and a cursor control device 30, such as a computer mouse, can also be operatively coupled to bus 21 to enable the user to interface with system.

According to one embodiment, memory 22 can store software modules that may provide functionality when executed by processor 27. The modules can include an operating system 23, object restorer module 24, as well as other functional modules 25. Operating system 23 can provide an operating system functionality for client 20. Object restorer module 24 provides for the restoration of an object from a data block which will be described below in more detail. Client 20 can also be part of a larger system. Thus, client 20 can include one or more additional functional modules 25 to include the additional functionality. In an embodiment, functional modules 25 may include modules that are part of the "Business Intelligence Visualizations" product from Oracle Corporation.

For example, functional modules 25 may include a Flash® rendering engine, which generates a view of data properties, and a Flash® SWF generation module. In the embodiment, the Flash® rendering engine includes a ActionScript scripting language. As one of ordinary skill would understand, ActionScript is an object-oriented programming language contained within the Flash® multimedia platform, which enables interactivity and data-handling in Flash® applications. Also, functional modules 25 may include an Internet browser.

Figure 3:
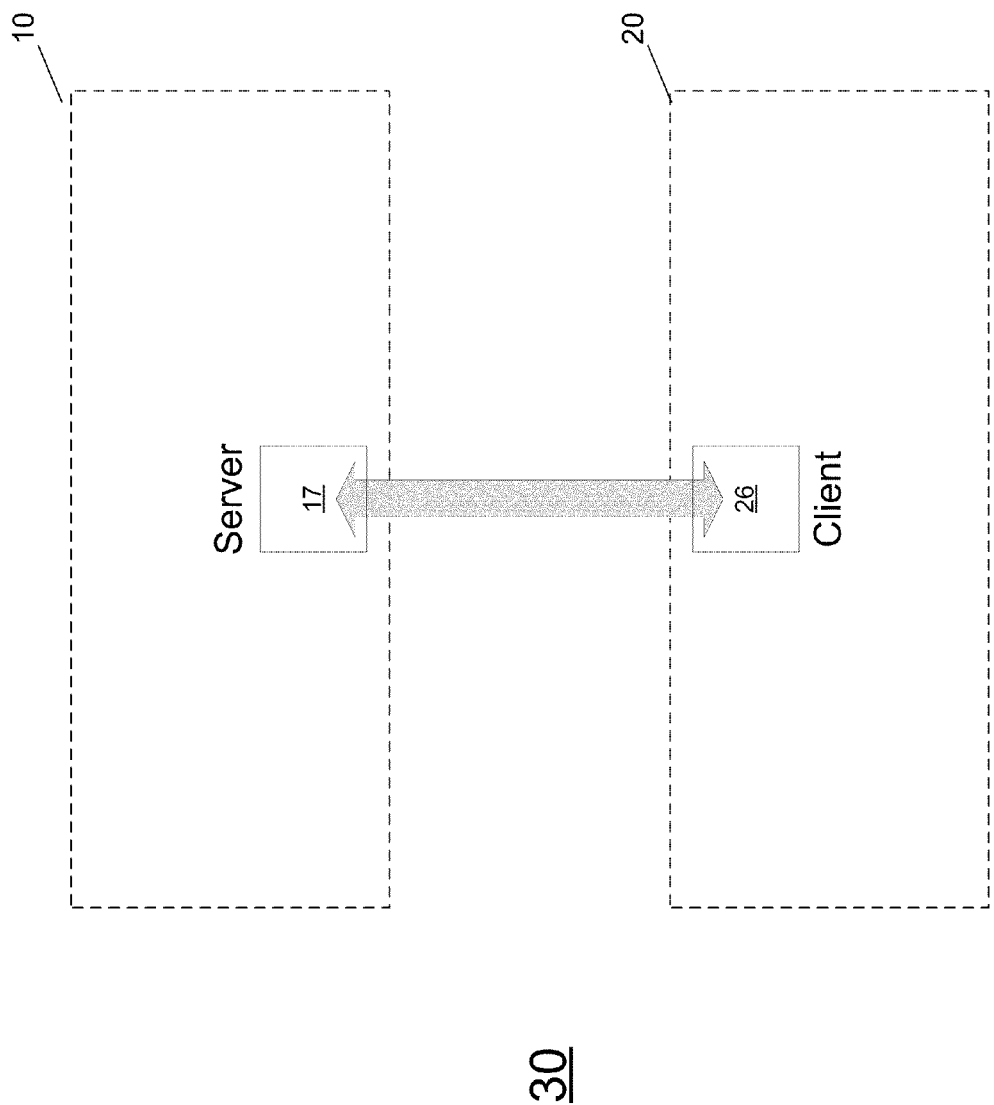
FIG. 3 illustrates a block diagram of a computer system including a server and a client that may implement an embodiment of the present invention.

FIG. 3 illustrates a block diagram of a computer system 30 that may implement one embodiment of the invention. In the embodiment, computer system 30 includes server 10 of FIG. 1 and client 20 of FIG. 2, and the structural components of server 10 of FIG. 1 and client 20 of FIG. 2 not relevant to the discussion of the specific embodiment have not been reproduced in FIG. 3. As described above with respect to FIG. 1 and FIG. 2, server 10 and client 20 communicate with each other through communication device 17 of server 10, and communication device 26 of client 20, respectively. One of ordinary skill in the art would understand that while in the illustrated embodiment, server 10 and client 20 include the configuration of server 10 in FIG. 1 and client 20 in FIG. 2, respectively, server 10 and client 20 may include configurations distinct from the configurations of FIG. 1 and FIG. 2.

In an embodiment of the invention, when the user selects a particular view, client 20 requests the selected view from server 10 via communication device 26. Upon request, server 10 transmits a viewing engine library and view data and properties, corresponding to the selected view, to client 20 via communication device 26. In a specific embodiment, server 10 transmits the viewing engine library and view data and properties via one or more Flash® SWF files.

Figure 4:
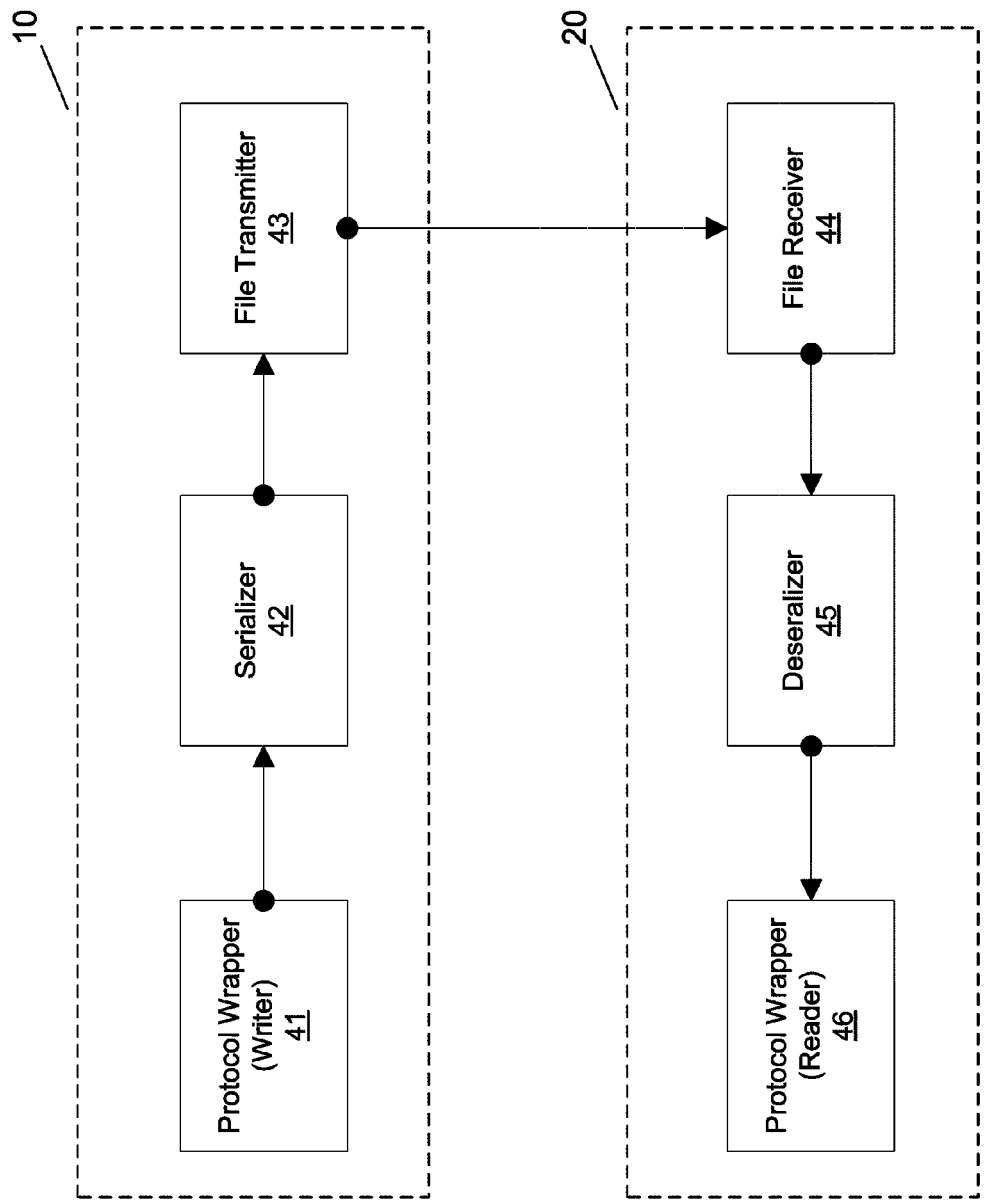
FIG. 4 illustrates a flow diagram of a process of a computer system in accordance with an embodiment of the invention.

FIG. 4 illustrates a flow diagram 40 of a computer system, according to one embodiment of the invention. In one embodiment, the functionality of flow diagram 40 of FIG. 4, as well as the functionality of flow diagram 50 in FIG. 5 and the functionality of flow diagram 60 in FIG. 6 described below, is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In the embodiment, the computer system includes a server 10 and a client 20. According to the embodiment, server 10 and client 20 of FIG. 4 include the configurations of server 10 of FIGS. 1 and 3, and client 20 of FIGS. 2 and 3. However, one of ordinary skill in the art would readily understand that server 10 and client 20 of FIG. 4 may be configured differently than the configurations shown in FIGS. 1-3 and still be within the scope of the invention.

According to the embodiment, a protocol wrapper is implemented on top of a serializer/deserializer to facilitate data exchanges between server 10 and client 20 in such a way that the protocol can be leveraged and extended to support current and new data types. The protocol wrapper and serializer/deserializer allow server 10 to extract object data created by server 10, convert the object data into a format suitable for transportation, transfer the data from server 10 to client 20, convert the format back into object data and populate an object created by client 20 with the object data.

As one of ordinary skill would understand, a wrapper is a tool that lets two objects work together that could not otherwise because of incompatible interfaces by converting the interface of a first object into another interface that a second object expects. The protocol wrapper allows the separation of the serializer/deserializer functionality, as described below in more detail, from the functionality of generating and displaying the data to be viewed, by utilizing a "identity-value" pair mechanism to establish an identity for each data value of the object based on the data type of the data value at server 10. In this way, the protocol wrapper identifies which data to extract and correspondingly populate in an object, at client 20. Once each "identity-value" pair is created, each identity and data value will be passed by the protocol wrapper to the serializer/deserializer as parameters and an appropriate method will be internally called based on the data type of the data value. The use of a protocol wrapper allows the serializer/deserializer functionality to be extended to implement future types of data or properties needed for future views to be developed.

As one of ordinary skill would understand, an object can be converted into a format suitable for transport through a serializer and a deserializer. A serializer saves the current state of an object to a sequence of bytes, such as a stream. A deserializer later constructs an equivalent object from the sequence of bytes. The sequence of bytes serves as a container for the object, where the sequence of bytes includes a representation of the object's data values and procedures. The container may be transient in order to allow the object to be transported from one application to another, possibly over a network. As an alternative, the container may be persistent so that the object may be stored on a storage medium, so that the object is accessible even after the application which created the object is terminated. In both cases, the information stored in the container can later be used to construct an equivalent object containing the same data values and procedures as the original object. In an embodiment of the invention, the serializer/deserializer uses a file as the container for the sequence of bytes, where the sequence of bytes are stored in a tag of the file, and where the file is transferred from server 10 to client 20. The use of a serializer/deserializer allows for a significant compression of the object data.

Server 10 includes a writer portion of a protocol wrapper functionality 41. At writer 41, an identity is created for each data value of an object that is to be transported to client 20. Server 10 also includes a serializer functionality 42, where for each data value to be transported, serializer 42 takes the identity generated by writer 41 and the data value as a parameter and internally calls an appropriate method based on the data type for the value. By doing so, serializer 42 writes the identity and the data value, converting the identity and the data value to a format through serialization. Serializer 42 performs the conversion process for each identity-value pair, thereby serializing the object data into the format. Server 10 also includes a file transmitter functionality 43. At file transmitter 43, a file is generated for transportation to the client. The serialized data in a format is inserted into a first tag of the file. The file is then transmitted to client 20. In an embodiment, the functionalities of writer 41, serializer 42, and file transmitter 43, as described above, are all performed by object converter module 15 of FIG. 1. However, in alternative embodiments, the functionalities of writer 41, serializer 42, and file transmitter 43 are performed by separate modules.

Client 20 includes a file receiver functionality 44, which receives the file generated by the file transmitter functionality of server 10. Client 20 also includes a deserializer functionality 45 which automatically deserializes the serialized data in a format which is contained within the first tag of the file and loaded into an object created by client 20. Client 20 also includes a reader portion of a protocol wrapper functionality 46. At reader 46, the deserialized data is read, when an identity is read first and, based on the identity type, the corresponding data value is read, and the respective data object is populated. In an embodiment, the functionalities of file receiver 44, deserializer 45, and reader 46, as described above, are performed by object restorer module 24 of FIG. 2. However, in alternative embodiments, the functionalities of file receiver 44, deserializer 45, and reader 46 are performed by separate modules.

Figure 5:
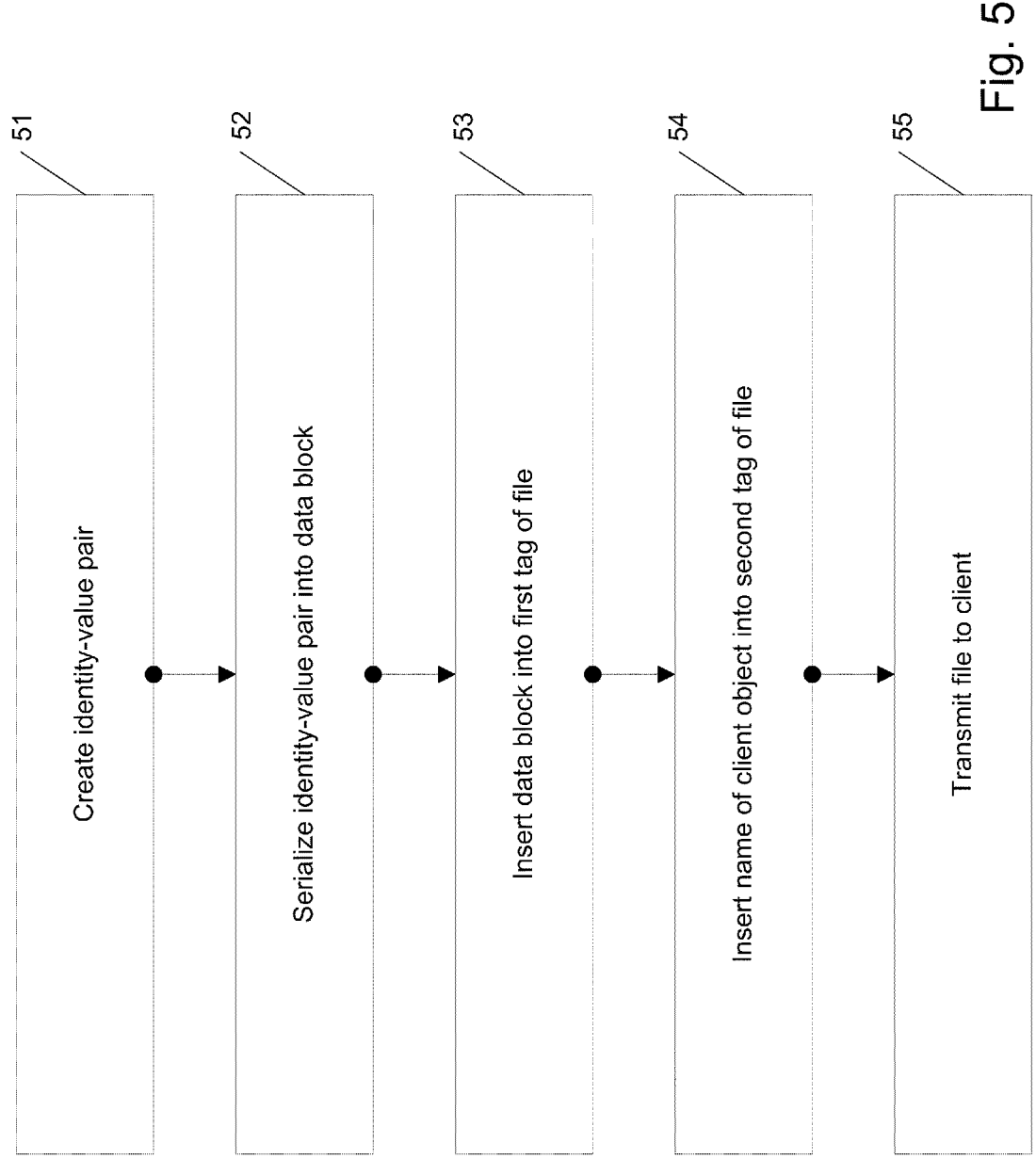
FIG. 5 illustrates a flow diagram of a process of a server in accordance with an embodiment of the present invention.

FIG. 5 illustrates a flow diagram 50 of the functionality of object converter module 15 of server 10, as illustrated in FIG. 1, according to one embodiment of the invention. As discussed above, object converter module 15 implements a writer portion of a protocol wrapper utilizing an identity-value pair mechanism, and a serializer, in order to serialize object data into a data block of a format.

At 51, object converter module 15 creates an identity-value pair where a unique identity is associated with a data value of the object to be serialized. In an embodiment of the invention, object converter module 15 defines a set of identities corresponding to object data types. In an embodiment of the invention where server 10 implements a Java® API, and thus, utilizes Java® objects to define the data view and data properties, object converter module 15 creates identities in the Java® programming language for Java® object data types.

Below is example pseudo-code for an identity definition for different Java® object data types, created by object converter module 15 according to an embodiment of the invention:

```
public class FlashVars {
  public static final int INVOKE_MODE = 0;
  public static final int LOCALE = 2;
  public static final int DATA_ARRAY = 7;
  public static final int VIEW_BACKGROUND_COLOR_PRIMARY = 9;
  public static final int VIEW_BACKGROUND_COLOR_SECONDARY = 10;
  public static final int VIEW_BORDER_WIDTH = 13;
  public static final int VIEW_BORDER_COLOR = 14;
  // Slider/combo-box related.
  public static final int HAS_RANGE_FILTER_SLIDER = 17;
  public static final int HAS_PLAYBACK_SLIDER = 18;
  public static final int HAS_COMBO_BOX = 19;
  // Plot area.
  public static final int PLOT_AREA_RECT_X = 20;
  public static final int PLOT_AREA_RECT_Y = 21;
  public static final int PLOT_AREA_RECT_WIDTH = 22;
  public static final int PLOT_AREA_RECT_HEIGHT = 23;
  public static final int PLOT_AREA_BORDER_COLOR = 24;
  public static final int PLOT_AREA_BORDER_WIDTH = 25;
  // Legend.
  public static final int LEGEND_RECT_X = 36;
  public static final int LEGEND_RECT_Y = 37;
  public static final int LEGEND_RECT_WIDTH = 38;
  public static final int LEGEND_RECT_HEIGHT = 39;
  public static final int LEGEND_FONT_NAME = 40;
  public static final int LEGEND_FONT_STYLE = 41;
  public static final int LEGEND_FONT_SIZE = 42;
  public static final int LEGEND_FONT_COLOR = 43;
  public static final int LEGEND_POSITION = 44;
  public static final int LEGEND_FILL_COLOR = 45;
  public static final int LEGEND_FILL_ALPHA = 46;
  public static final int LEGEND_BORDER_WIDTH = 47;
  public static final int LEGEND_BORDER_COLOR = 48;
  // TextBox related variables.
  public static final int TEXT_BOX_TYPE = 232;
  public static final int TEXT_BOX_TEXT = 233;
  public static final int TEXT_BOX_BORDER_WIDTH = 234;
  public static final int TEXT_BOX_BORDER_COLOR = 235;
  public static final int TEXT_BOX_ROTATION = 236;
  public static final int TEXT_BOX_X = 237;
  public static final int TEXT_BOX_Y = 238;
  public static final int TEXT_BOX_WIDTH = 239;
  public static final int TEXT_BOX_HEIGHT = 240;
  public static final int TEXT_BOX_FONT_NAME = 241;
  public static final int TEXT_BOX_FONT_STYLE = 242;
  public static final int TEXT_BOX_FONT_SIZE = 243;
  public static final int TEXT_BOX_FONT_COLOR = 244;
  // DataLabel related variables.
  public static final int DATA_LABELS_FORMAT_INFO = 330;
  public static final int DATA_LABELS_SHOW_TYPE = 331;
  public static final int DATA_LABELS_FILL_COLOR = 332;
  public static final int DATA_LABELS_FILL_ALPHA = 333;
  public static final int DATA_LABELS_POSITION = 334;
  public static final int DATA_LABELS_BORDER_WIDTH = 335;
  public static final int DATA_LABELS_BORDER_COLOR = 336;
  // Font related variables.
  public static final int DATA_LABELS_FONT_NAME = 337;
  public static final int DATA_LABELS_FONT_STYLE = 338;
  public static final int DATA_LABELS_FONT_SIZE = 339;
  public static final int DATA_LABELS_FONT_COLOR = 340;
}
```

In the above example, the values INVOKE_MODE, LOCALE, DATA_ARRAY, etc., represent the various data types of the Java® object data, and the integer values 0, 2, 7, etc., represent the identities that are associated with each data type. In the example, the list of data types and corresponding identities are common for all views, with specific views extending this list and adding specific data types and identities for that particular view. Furthermore, in the above example, as will be discussed below in more detail, the same identities are defined on the corresponding client side in order to retrieve the data correctly. One of ordinary skill in the art would understand that the above example is a non-limiting embodiment, and that the identity definition of object converter module 15 could take other forms and still be within the scope of the invention. In the embodiment of the invention, each identity is then associated with a data value of the object depending on the type of the data value. For example, in the embodiment disclosed above, a data value of the data type INVOKE_MODE would be assigned an identity of 0, a data value of the data type LOCALE would be assigned an identity of 2, a data value of the data type DATA_ARRAY would be assigned an identity of 7, etc. In the embodiment, the other data values would each be assigned an identity accordingly.

At 52, the identity and data value are provided to a serializer, where the serializer writes the identity and data value to a data block of a format. The view engine of server 10 uses the APIs provided by the serializer to write data using a single API. The serializer API takes an identity and data value as a parameter, and internally calls an appropriate method based on the data type for the data value. Thus, for each identity-value pair, the identity is first written, followed by the data value. In this manner, the functionality of the serializer remains separate from the remaining functionality of server 10.

Below is example pseudo-code for providing the respective identity-value pairs to the serializer, where the serializer writes the identity and data value to a data block of a format, according to an embodiment of the invention:

```
int seriesCount = m_dataConverter.getMaxSeriesCount( );
int[ ] seriesColors = new int[seriesCount];
int colorCount = m_biChartProperties.colorPalette.colors.length;
for (int i = 0; i < seriesCount; i++) {
    seriesColors[i] =
        m_biChartProperties.colorPalette.colors[i % colorCount];
}
m_swfGenerator.pushData(FlashVars.SERIES_COLORS, seriesColors);
```

In the above example, m_swfGenerator is an instance of framework class SWFGenerator and will be passed to a FlashChartRender class. The SWFGenerator class invokes the serializer module to write the data by calling a pushData( ) method with the identity and data value as parameters.

According to an embodiment of the invention, the Java® object data is serialized into an Action Message Format ("AMF") through an AMF serializer, such as AMF Version 3 ("AMF3"). AMF is a compact binary format that is used to serialize object graphs. Once serialized, an AMF encoded object graph may be used to persist and retrieve a public state of an application across sessions or allow two endpoints to communicate through the exchange of strongly typed data. In particular, AMF3 makes uses of a special compact format for writing integers to reduce the number of bytes required for encoding.

At 53, the serialized object data (which is in the format), is inserted into a first tag of a file. If the file does not already exist, the file can be created before the serialized object data is inserted into the first tag. According to an embodiment of the invention, the file is a Flash® SWF file, and the tag is a DefineBinaryData tag. According to the Flash®9 file format, the DefineBinaryData tag permits arbitrary binary data to be embedded in a SWF file. The DefineBinaryData tag associates a blob of binary data with a standard SWF 16-bit character ID. The character ID is entered into the SWF file's character dictionary.

At 54, a name of an object that is to be created using the serialized object data is inserted into a second tag of the file. This is needed so that when a client receives the serialized object data, the client will know which object to create and load the object data into, once it is deserialized. According to an embodiment of the invention, the tag is a SymbolClass tag. According to the Flash®9 file format, the SymbolClass tag can be used to associate a DefineBinaryData tag with an ActionScript 3.0 class definition. The ActionScript 3.0 class must be a subclass of ByteArray. When the class is instantiated, it will be populated automatically with the contents of the DefineBinaryData tag. At 55, the file is transmitted to a client.

One of ordinary skill in the art would understand that object converter module 15 of FIG. 1 can perform the above functionality for a plurality of identity-value pairs, and thus, converts an object's data values into the data block of the format.

Figure 6:
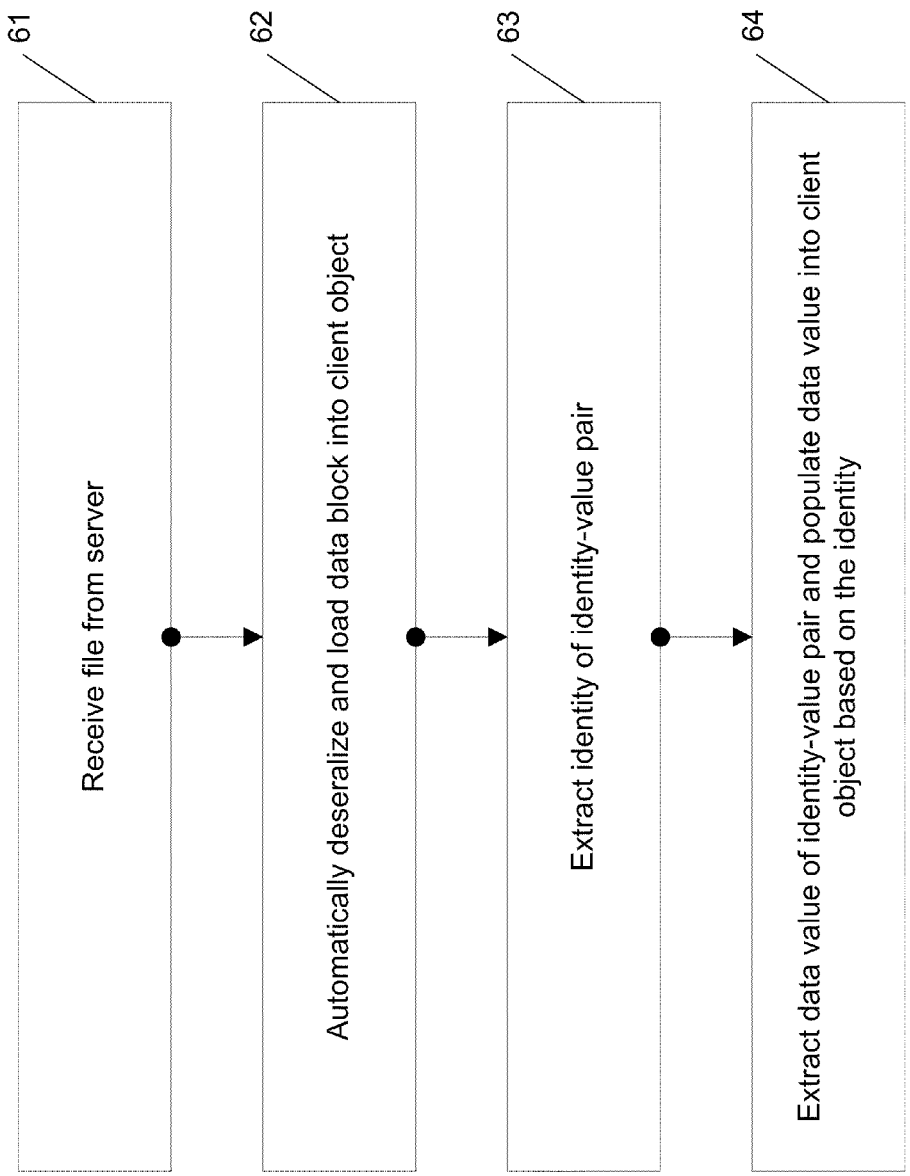
FIG. 6 illustrates a flow diagram of a process of a client in accordance with an embodiment of the present invention.

FIG. 6 illustrates a flow diagram 60 of the functionality of object restorer module 24 of client 20, as illustrated in FIG. 2, according to one embodiment of the invention. As discussed above, object restorer module 24 implements a reader portion of a protocol wrapper utilizing an identity-value pair mechanism, and a deserializer, in order to deserialize a data block of a format into object data.

At 61, a file is received from a server, where the file includes a data block of a format that has been serialized in a first tag, and a name of a client object in a second tag. The serialized data block includes an identity-value pair, as discussed above. In an embodiment of the invention, as described above, the file is a Flash® SWF file which includes serialized AMF data in a DefineBinaryData tag and a name of an ActionScript 3.0 class in a SymbolClass tag. Furthermore, according the an embodiment of the invention, the ActionScript 3.0 class extends the ByteArray class.

At 62, a client object is created based on the client object name included in the second tag of the file, and the serialized data block is automatically deserialized and loaded into the client object. In an embodiment of the invention, as discussed above, the client object name indicates to object restorer module 24 what object should be created. According to an embodiment of the invention, the tag is a SymbolClass tag. According to the Flash®9 file format, the SymbolClass tag is used to associate a DefineBinaryData tag with an ActionScript 3.0 class definition, which is a subclass of ByteArray. Thus, in the embodiment of the invention, the ActionScript 3.0 class name in the SymbolClass tag indicates which ActionScript 3.0 class is to be instantiated. When the ActionScript 3.0 class is instantiated, the AMF3 serialized data in the DefineBinaryTag is automatically de-serialized and loaded into the ActionScript 3.0 class.

At 63, the identity of the identity-value pair is extracted. At 64, the data value of the identity-value pair is extracted and populated into the client object based on the data type of the identity. According to an embodiment of the invention, a list of identities is defined for a plurality of object data types, as discussed above with respect to object converter module 15 of server 10. The list of identities created by object restorer module 24 of client 20 matches the list of identities created by object converted module 14 of server 10.

Below is example pseudo-code for a reader which extracts the data that has been automatically deserialized by the deserializer, according to an embodiment of the invention:

```
public function ViewBaseDataReader(viewDataBytes:ViewDataBytes) {
    m_viewDataBytes = viewDataBytes;
}
public function retrieveData( ):void {
    if (m_viewDataBytes.bytesAvailable > 0) {
        m_viewProperties = createViewProperties( );
        m_viewData = createViewData( );
        while (m_viewDataBytes.bytesAvailable > 0) {
            m_varId = m_viewDataBytes.readObject( );
            read Data( );
        }
```

-continued

```
        retrieveViewProperties( );
        retrieveViewData( );
    }
}
protected function readData( ):void {
    switch (m_varId) {
        case ViewDataIds.INVOKE_MODE:
            m_viewProperties.invokeMode = m_viewDataBytes.readObject( );
            break;
        case ViewDataIds.LOCALE:
            m_viewProperties.locale = m_viewDataBytes.readObject( );
            break;
        case ViewDataIds.DATA_ARRAY:
            m_viewData.dataArray = m_viewDataBytes.readObject( );
            break;
. . . etc.
}
```

In the above example, m_ViewDataBytes is a class that extends ByteArray Class. When the Flash® view engine loader loads the SWF file, it instantiates the ViewDataBytes class and passes it on to a ViewComposer class. The View-Composer class, when instantiated will first create an instance of ViewBaseDataReader class, will call a retrieveData( ) method, will call a readObject( ) method to read the identity, and will call a readData( ) method. The readData( ) method will examine the identity and call an appropriate readObject( ) method depending on the identity, in order to read the data value. Specific views extend the ViewBaseDataReader class to provide additional support to read specific data.

One of ordinary skill in the art would understand that object restorer module 24 of FIG. 2 can perform the above functionality for a plurality of identity-value pairs, and thus, convert the data block of the format into an object which includes populated data values.

Figure 7:
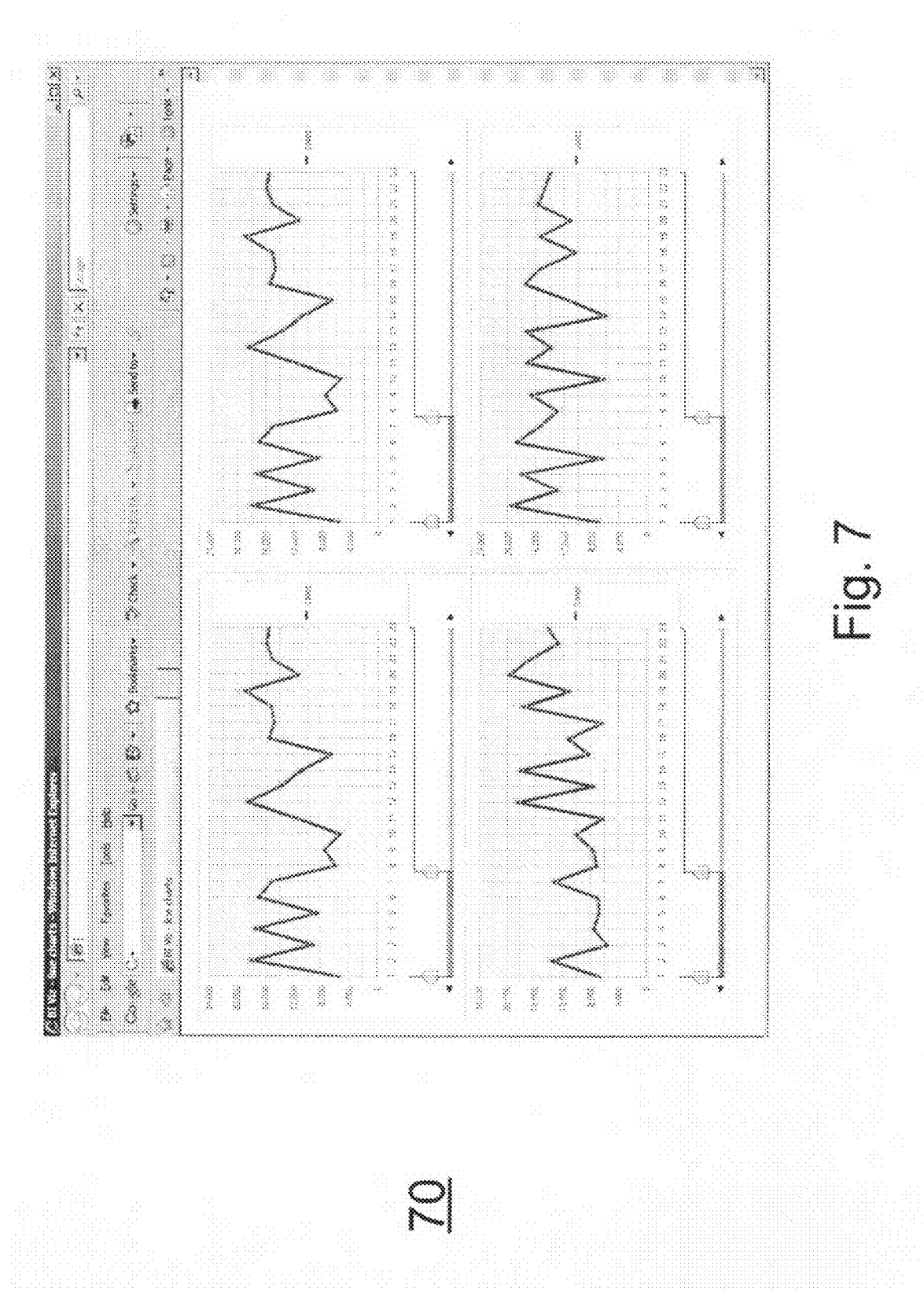
FIG. 7 illustrates a display of a computer system in accordance with an embodiment of the invention.

FIG. 7 illustrates a display 70 of a computer system that may implement one embodiment of the invention. Display 70 illustrates four line charts created by the Business Intelligence Visualizations application according to an embodiment of the invention. The server of the computer system is in "online mode," so that the server has sent to the client of the computer system a viewing engine library, which includes the implementation methods and data necessary to render the view, and the view data and properties via separate files. The four line charts have 50,000 data points, 30,000 data points, 20,000 data points, and 15,000 data points, respectively. A user may scroll to the next data point of each line chart by clicking on the right arrow of each respective char's slide view window.

Figure 8:
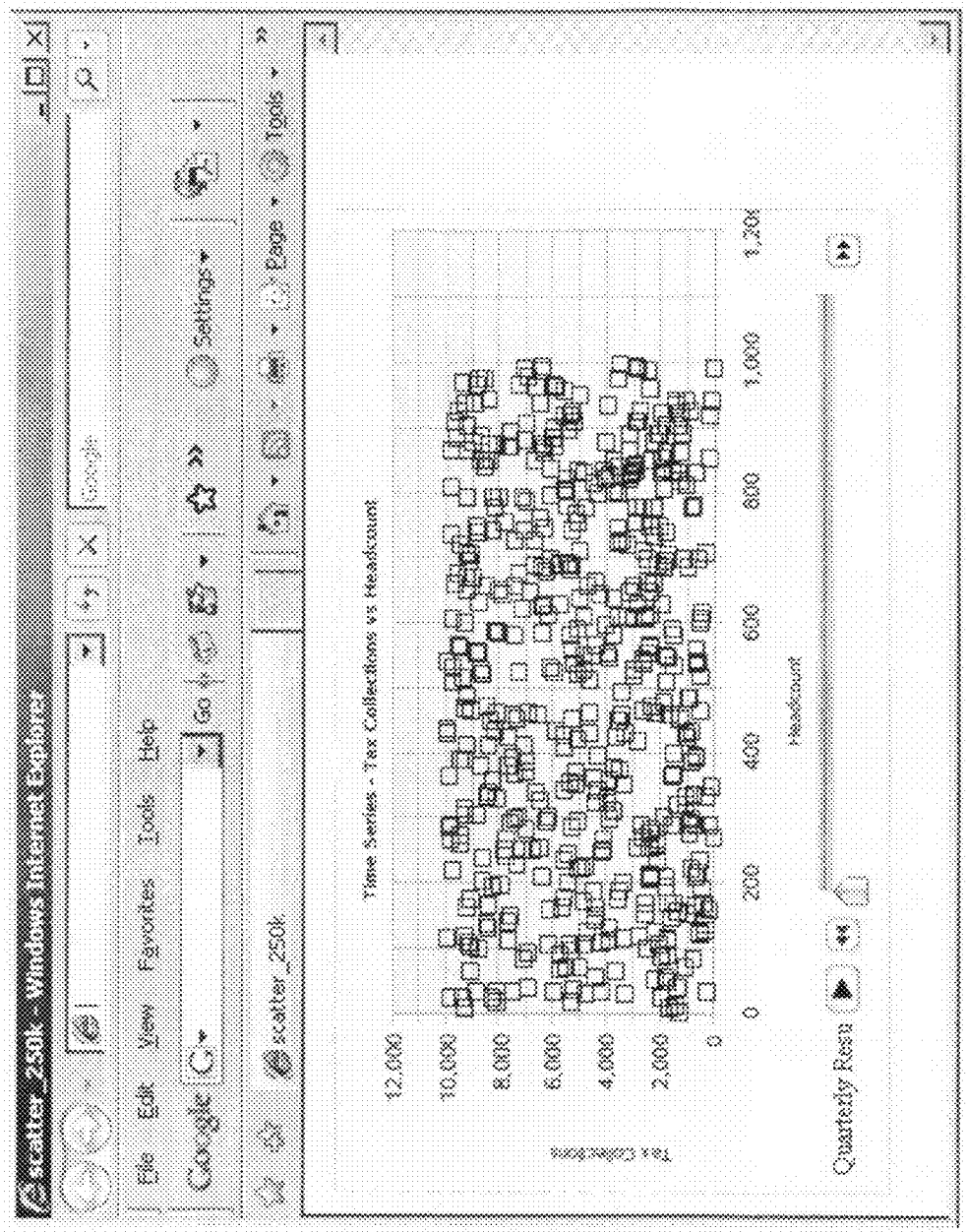
FIG. 8 illustrates a display of a computer system in accordance with an embodiment of the invention.

FIG. 8 illustrates a display 80 of a computer system that may implement one embodiment of the invention. Display 80 illustrates a scatter chart created by the Business Intelligence Visualizations application according to an embodiment of the invention. The server of the computer system is in "offline" mode, so the server has sent to the client a self-sufficient file. The chart of display 80 contains 250,000 data points, where each view displays a page of 500 data points at a time, and where the chart includes 500 pages. A user can use a slider's forward/backward button to navigate through the pages.

Thus, an embodiment of the invention provides for the insertion of compressed and serialized data into a tag of a file and sending the file to the client during runtime when a view gets created with a specific data model. The embodiment of the invention also provides for the implementation of a protocol to write the serialized data on the server and extract the deserialized data on the client via an identity-value pair mechanism to identify which data to extract and correspondingly populate to the client object. According to an embodiment of the invention, a large amount of data (in the order of millions of data points) can be exchanged from a server to a client. Furthermore, in scenarios where the data volume is significant, the size of the data file can be reduced by a factor of 10. Finally, the protocol can be further extended to incorporate any type of data needed to develop a future view.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A non-transitory computer-readable medium having instructions stored thereon, when executed by a processor, cause the processor to convert an object, the instructions comprising:
    defining a list of one or more identities associated with one or more data types;
    associating an identity with a data value of a server object to create an identity-value pair, wherein the associating the identity with the data value of the server object is based on a data type of the server object;
    serializing the server object into a compressed serialized data block of a format using the identity-value pair, wherein the format comprises a compact format that reduces a size of the compressed serialized data block;
    inserting the compressed serialized data block into a first tag of a first multimedia file, wherein the first tag permits binary data to be embedded in the first multimedia file, and wherein the first tag associates a binary large object of the binary data with a character identity;
    inserting a name of a client object into a second tag of the first multimedia file; and
    transmitting the first multimedia file to a client.

2. The non-transitory computer-readable medium of claim 1, the instructions further comprising transmitting a second multimedia file to the client, wherein the second multimedia file comprises a viewing engine library.

3. The non-transitory computer-readable medium of claim 1, wherein the first multimedia file further comprises a viewing engine library.

4. The non-transitory computer-readable medium of claim 1, wherein the server object is a Java® programming language object.

5. The non-transitory computer-readable medium of claim 1, wherein the format is an Action Message Format.

6. The non-transitory computer-readable medium of claim 1, wherein the first multimedia file is a Flash® 9 Small Web Format file, wherein the first tag is a DefineBinaryData tag, and wherein the second tag is a SymbolClass tag.

7. A non-transitory computer-readable medium having instructions stored thereon, when executed by a processor, cause the processor to restore an object, the instructions comprising:
defining a list of one or more identities associated with one or more data types;
receiving a first multimedia file from a server, wherein the first multimedia file comprises a first tag and a second tag, wherein the first tag comprises a compressed serialized data block of a format, wherein the first tag permits binary data to be embedded in the first multimedia file, wherein the first tag associates a binary large object of the binary data with a character identity, wherein the format comprises a compact format that reduces a size of the compressed serialized data block, wherein the second tag comprises a name of a client object, wherein the compressed serialized data block comprises an identity-value pair where an identity is associated with a data value of a server object, and wherein the identity is associated with the data value of the server object based on a data type of the server object;
automatically deserializing and loading the compressed serialized data block into a client object based on the name of the client object within the second tag;
extracting an identity of the identity-value pair; and
extracting a data value of the identity-value pair and populating the data value into the client object based on the identity of the identity-value pair.

8. The non-transitory computer-readable medium of claim 7, the instructions further comprising receiving a second multimedia file from the server, wherein the second multimedia file comprises a viewing engine library.

9. The non-transitory computer-readable medium of claim 7, wherein the first multimedia file further comprises a viewing engine library.

10. The non-transitory computer-readable medium of claim 7, wherein the client object is an ActionScript object.

11. A computer-implemented method for converting an object, the method comprising:
defining a list of one or more identities associated with one or more data types;
associating an identity with a data value of a server object to create an identity-value pair, wherein the associating the identity with the data value of the server object is based on a data type of the server object;
serializing the server object into a compressed serialized data block of a format using the identity-value pair, wherein the format comprises a compact format that reduces a size of the compressed serialized data block;
inserting the compressed serialized data block into a first tag of a first multimedia file, wherein the first tag permits binary data to be embedded in the first multimedia file, and wherein the first tag associates a binary large object of the binary data with a character identity;
inserting a name of a client object into a second tag of the first multimedia file; and
transmitting the first multimedia file to a client.

12. The computer-implemented method of claim 11, the computer-implemented method further comprising transmitting a second multimedia file to the client, wherein the second file comprises a viewing engine library.

13. The computer-implemented method of claim 11, wherein the first multimedia file further comprises a viewing engine library.

14. A computer-implemented method for restoring an object, the method comprising:
defining a list of one ore more identities associated with one or more data types;
receiving a first multimedia file from a server, wherein the first multimedia file comprises a first tag and a second tag, wherein the first tag comprises a compressed serialized data block of a format, wherein the first tag permits binary data to be embedded in the first multimedia file, wherein the first tag associates a binary large object of the binary data with a character identity, wherein the format comprises a compact format that reduces a size of the compressed serialized data block, wherein the second tag comprises a name of a client object, wherein the compressed serialized data block comprises an identity-value pair where an identity is associated with a data value of a server object, and wherein the identity is associated with the data value of the server object based on a data type of the server object;
automatically deserializing and loading the compressed serialized data block into a client object based on the name of the client object within the second tag;
extracting an identity of the identity-value pair; and
extracting a data value of the identity-value pair and populating the data value into the client object based on the identity of the identity-value pair.

15. The computer-implemented method of claim 14, the computer-implemented method further comprising transmitting a second multimedia file to the client, wherein the second multimedia file comprises a viewing engine library.

16. The computer-implemented method of claim 14, wherein the first multimedia file further comprises a viewing engine library.

17. A system for converting and restoring an object, the system comprising:
a server, wherein the server comprises a processor; and
a client, wherein the client comprises a processor,
wherein the server is configured to,
define a list of one or more identities associated with one or more data types;
associate an identity with a data value of a server object to create an identity-value pair, wherein the associating the identity with the data value of the server object is based on a data type of the server object,
serialize the server object into a compressed serialized data block of a format using the identity-value pair, wherein the format comprises a compact format that reduces a size of the compressed serialized data block,
insert the compressed serialized data block into a first tag of a first multimedia file, wherein the first tag permits binary data to be embedded in the first multimedia file, and wherein the first tag associates a binary large object of the binary data with a character identity,
insert a name of a client object into a second tag of the first multimedia file, and
transmit the first multimedia file to a client, and
wherein the client is configured to
receive the first multimedia file from a server, wherein the first tag comprises the compressed serialized data block of a format, wherein the second tag comprises the name of a client object, and wherein the compressed serialized data block comprises the identity-value pair where the identity is associated with the data value of the server object, automatically deserialize and load the compressed serialized data block into the client object based on the name of the client object within the second tag, extract the identity of the identity-value pair, and extract the data value of the identity-value pair and populate the data value into the client object based on the identity of the identity-value pair.

18. The system of claim 17, wherein the server is further configured to transmit a second multimedia file to the client, wherein the second multimedia file comprises a viewing engine library, and wherein the client is further configured to receive the second multimedia file from the server.

19. The system of claim 17, wherein the first multimedia file comprise a viewing engine library.

* * * * *

UNITED STATES PATENT AND TRADEMARK OFFICE
CERTIFICATE OF CORRECTION

| | |
|---|---|
| PATENT NO. | : 8,656,055 B2 |
| APPLICATION NO. | : 12/547203 |
| DATED | : February 18, 2014 |
| INVENTOR(S) | : Das |

It is certified that error appears in the above-identified patent and that said Letters Patent is hereby corrected as shown below:

In the Specification

In column 3, line 63, delete "Flash ®" and insert -- Flash® --, therefor.

In the Claims

In column 14, line 6, in Claim 14, delete "one ore more" and insert -- one or more --, therefor.

Signed and Sealed this
Twenty-fourth Day of June, 2014

Michelle K. Lee
*Deputy Director of the United States Patent and Trademark Office*